(12) United States Patent
Schmidt-Schäffer

(10) Patent No.: US 12,715,585 B2
(45) Date of Patent: Aug. 25, 2026

(54) PASSENGER COMPARTMENT

(71) Applicant: Airbus Operations GmbH, Hamburg (DE)

(72) Inventor: Tobias Schmidt-Schäffer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 10 days.

(21) Appl. No.: 19/215,576

(22) Filed: May 22, 2025

(65) Prior Publication Data

US 2025/0361014 A1 Nov. 27, 2025

(30) Foreign Application Priority Data

May 27, 2024 (DE) ........................ 102024114823.3

(51) Int. Cl.
*B64D 11/06* (2006.01)

(52) U.S. Cl.
CPC ...... *B64D 11/0606* (2014.12); *B64D 11/0605* (2014.12)

(58) Field of Classification Search
CPC ............ B64D 11/0606; B64D 11/0605; B64D 11/0604; B64D 11/0602; B64D 11/0023; B64D 2011/0069; B64D 2011/0076; B64D 2011/0084
See application file for complete search history.

(56) References Cited

U.S. PATENT DOCUMENTS

| | | | | |
|---|---|---|---|---|
| 7,934,679 | B2 * | 5/2011 | Bock .................. | B64D 11/0606 244/118.6 |
| 9,555,889 | B2 | 1/2017 | Wartena et al. | |
| 10,029,778 | B2 | 7/2018 | Telmos | |
| 10,131,432 | B2 * | 11/2018 | Simeon .............. | B64D 11/0606 |
| 10,160,532 | B2 | 12/2018 | Schartner et al. | |
| 10,625,860 | B2 | 4/2020 | Rafler et al. | |
| 11,077,947 | B2 * | 8/2021 | Dowty ............... | B64D 11/0606 |
| 11,312,494 | B2 * | 4/2022 | O'Neill .............. | B64D 11/0606 |
| 11,312,497 | B2 * | 4/2022 | Herault .............. | B64D 11/0606 |
| 11,377,214 | B2 | 7/2022 | Robinson | |

(Continued)

FOREIGN PATENT DOCUMENTS

| | | |
|---|---|---|
| DE | 102014111673 A1 | 4/2015 |
| DE | 102016109290 A1 | 11/2016 |

(Continued)

OTHER PUBLICATIONS

German Search Report for corresponding German Patent Application No. 102024114823.3 dated May 27, 2025.

*Primary Examiner* — Richard Green
(74) *Attorney, Agent, or Firm* — Greer, Burns & Crain, Ltd.

(57) ABSTRACT

A passenger compartment for an aircraft cabin, which has an enclosing wall and a compartment space formed by the enclosing wall and in which at least one passenger seating device is arranged. The enclosing wall has wall sections which extend from the floor at least up to the head height of a standing passenger. At least a part of the wall sections are designed as hybrid walls, each of which has a lower wall segment and an upper wall segment, the lower wall segment is formed fixed, and the upper wall segment is formed variable, so that a permeability of the upper wall segment is modifiable.

14 Claims, 14 Drawing Sheets

(56) References Cited

U.S. PATENT DOCUMENTS

| | | | | |
|---|---|---|---|---|
| 11,767,120 | B2 * | 9/2023 | Constantin | B64D 11/0606 244/118.6 |
| 11,851,186 | B2 | 12/2023 | Bonnefoy et al. | |
| 11,993,383 | B2 * | 5/2024 | Woodington | B64D 11/0606 |
| 12,304,636 | B2 * | 5/2025 | James | B64D 11/0606 |
| 2016/0052633 | A1 * | 2/2016 | Lawson | B64D 11/0606 244/118.6 |
| 2016/0059966 | A1 * | 3/2016 | Dryburgh | B64D 11/0604 244/118.6 |
| 2019/0248498 | A1 * | 8/2019 | Kimizuka | B64D 11/0606 |
| 2021/0061468 | A1 * | 3/2021 | Robert | B64D 11/0606 |

FOREIGN PATENT DOCUMENTS

| | | | |
|---|---|---|---|
| DE | 102017101144 | A1 | 7/2017 |
| DE | 102016013504 | A1 | 5/2018 |
| DE | 102018002863 | A1 | 10/2019 |
| DE | 102018120609 | A1 | 2/2020 |
| EP | 3225548 | A1 | 10/2017 |
| WO | 2018093825 | A1 | 5/2018 |

* cited by examiner

PASSENGER COMPARTMENT

CROSS-REFERENCES TO RELATED APPLICATIONS

This application claims the benefit of German Patent Application Number 10 2024 114 823.3 filed on May 27, 2024, the entire disclosure of which is incorporated herein by way of reference.

FIELD OF THE INVENTION

The present invention relates to facilities for accommodating passengers on board of aircraft. In particular, the present invention relates to a passenger compartment for an aircraft cabin, to an aircraft and to a method for adapting an aircraft cabin compartment.

BACKGROUND TO THE INVENTION

In aircraft, e.g. airplanes, different travel options, i.e. comfort levels for the stay on board, can be offered within the cabin, for example simple passenger seats in so-called economy class, seats with extended adjustment options and more space in business class, or comfort seats with reclining functions in first class. Mobile partitions can be used between the different comfort categories during the flight. In first class, for example, partitions can also be provided between individual seats to give passengers more privacy during their stay on board. However, it has been shown that there is a need for even more comfort on the part of users.

SUMMARY OF THE INVENTION

An object of the present invention is therefore to provide an accommodating device with improved user comfort for passengers of an aircraft.

This object may be solved by one or more embodiments described herein for a passenger compartment for an aircraft cabin and also to an aircraft and to a method for adapting an aircraft cabin compartment.

According to the invention, a passenger compartment is provided for an aircraft cabin. The passenger compartment has an enclosing wall and a compartment space formed by the enclosing wall, in which compartment space at least one passenger seating device is arranged. The enclosing wall has wall sections which extend from the floor at least up to the head height of a standing passenger. At least a part of the wall sections is designed as hybrid walls, each of which has a lower wall segment and an upper wall segment, the lower wall segment is formed fixed, and the upper wall segment is formed variable, so that a permeability in this area is modifiable.

The advantage is a spatial effect that avoids a box-like impression when staying in the compartment space. The division into lower wall segments and upper wall segments creates a space that conveys a sense of security, i.e., security and privacy, in the lower area and allows a controllable connection to the cabin area in the upper area.

The advantage is a versatile and adaptable compartment.

For example, when passengers are boarding, the upper area can be open, for example to provide a view into the compartment and also to create a more spacious impression. During certain flight phases or waiting phases on the ground, the compartment can be closed off more or even completely by the upper wall segments, for example to provide peace and privacy within the compartment.

The variable upper wall sections, for example, allow for gradual closing and opening.

The passenger compartment may be provided as part of a new aircraft cabin interior. For example, the aircraft cabin is an aircraft interior assembled by the purchaser of the aircraft.

However, the passenger compartment can also be part of a retrofittable interior for existing aircraft.

The passenger compartment is provided, for example, as a first-class compartment in which the cabin, i.e. the compartment, can be closed at full height to the aisle, but still forms at least a partially separated compartment even when open.

For this, a hybrid shell concept is provided, which can be completely closed, whereby the lower part of the suite is fitted with hard shells and doors, and the upper part of the suite (up to the ceiling) is fitted with curtains, for example. In an option, floating curtain rails above the suite are also provided as lighting elements, modern chandeliers so to speak, to illuminate the room. The curtain rails can be attached either to the ceiling or to the lower shell of the suite.

In an option, the hybrid shell solution offers maximum space and privacy inside the compartment thanks to the full height and the curved shape of the hard shell (lower section). This also allows the aisle space to be optimized by providing more width at shoulder height. The upper part of the compartment can be closed with curtains to create maximum privacy and ambience with a relatively simple solution. The curtains for the upper part allow better air circulation, an emergency exit and also have the advantage that the overall atmosphere is more inviting when open (for boarding/disembarking).

According to an aspect, a fully closeable first-class compartment is provided, for example with compartment walls with hard shell doors for the lower part reaching up to shoulder height and curtain-like elements for closing the upper part of the suite. There are curtain rails above the suite, which are attached either to the suite/compartment or to the ceiling above the suite. A lighting element is also integrated into the rails, which can be used to individually illuminate and adjust the ambience of each suite.

In an example, one or more passenger seats are arranged in the compartment. For example, the seats can also be converted into reclining surfaces. Beds can also be provided in the compartment, for example fold-out beds. A table and other storage surfaces may also be provided in the compartment.

According to an example, the enclosing wall surrounds the compartment space circumferentially, i.e., all the way around.

According to an example, the permeability for air and light is modifiable in the upper wall segment of wall sections designed as hybrid walls.

According to an example, in the wall sections designed as hybrid walls, the upper wall segment has a movable closure device with which an opening in the enclosing wall can be blocked.

According to an example, the movable closure device can be moved between a closure position and an opening position.

In a first option, the opening is closed nontransparent by the closure device in the closure position, and at least partly transparent in the opening position.

In a second option, the opening is closed acoustically attenuating by the closure device in the closure position compared to the opening position.

In a third option, an air exchange between the compartment space and an adjacent surrounding of the aircraft cabin via the opening is reduced by the closure device in the closure position compared to the opening position.

In a further option, the first option is provided in combination with the second option. In a still further option, the first option is provided in combination with the third option. In an additional option, the first option is provided in combination with the second and third options. In another option, the second option is provided in combination with the third option.

According to an example, the enclosing wall has at least two adjacent upper wall segments of two sides of the compartment space which are adjacent to each other in a horizontal direction, and which can be opened in such a way that an opening is formed which extends at least partially over the two adjacent sides of the compartment space.

The opening of the compartment across the corner creates a particularly advantageous spatial effect, especially from the aisle area. The compartment thus recedes even further into the background.

According to an example, the lower wall segment extends from the floor to at least above the head height of a seated person. As an option, it is provided that the upper wall sections extend up to the cabin ceiling or up to fixtures in the ceiling area of the cabin.

According to an example, in one variant the lower wall segment has a fixed wall shell. Additionally or alternatively, it is provided that the upper wall segment is resilient over at least half of its area when the opening is closed.

A resilient surface acts less as a hard edge. This minimizes the constricting effect on adjacent areas, for example common areas or traffic areas on board the aircraft.

According to an example, the vertical extent of the lower wall segment of at least some of the wall sections is inclined towards the compartment space from the floor.

This results in improved utilization of the available space: The size of the compartment can be maximized, and there is still enough room to move in the aisle area in the shoulder area.

According to an example, the upper wall segment has a horizontally slidable curtain.

According to an example, the curtain is held movably at the top on a rail and guided in the lower area in a receptacle on the lower fixed wall shell. As an option, the curtain is provided with vertically extending reinforcement areas.

According to an example, the upper wall segment has at least one element from the group comprising a horizontally slidable closure element, a foldable closure element which has a plurality of vertically running folding axes, vertical slats which are rotatable about a vertical axis and optionally also horizontally slidable, a roller blind which can be wound in the horizontal direction on a vertical axis, and a roller blind which can be wound in the vertical direction on a horizontal axis.

According to an example, the enclosing wall has a door area. An access opening to the compartment space is formed in the door area and the access opening is closeable with a movable door device. As an option, it is provided that the door device has a lower door segment and an upper door segment that are movable independently from each other.

The door segment thus complements the variability of the compartment shell.

According to the invention, an aircraft is also provided. The aircraft has a fuselage, and an aircraft cabin formed in the fuselage. At least one passenger compartment according to one of the preceding examples is provided in the aircraft cabin.

According to the invention, also a method for adapting an aircraft cabin compartment is provided. The method comprises the following steps:

a) providing a passenger compartment according to any of the preceding examples; and
b) varying the permeability of the at least one upper wall segment.

According to an aspect of the invention, a cabin compartment is formed by hybrid walls. For this purpose, the walls have a lower, non-modifiable part and an upper part that can be varied in terms of permeability, for example by opening the upper wall segments. The cabin compartment can be separated or sealed off from the rest of the cabin thanks to the hybrid walls. The areas can be opened to allow a connection to the cabin. This also creates a more open overall impression for people outside the compartment, for example when getting on and off the aircraft.

It should be noted that the features of the embodiments of the passenger compartment for an aircraft cabin also apply to embodiments of the aircraft and to the method for adapting an aircraft cabin compartment, and vice versa. Furthermore, those features for which this is not explicitly mentioned can also be freely combined with one another.

BRIEF DESCRIPTION OF THE DRAWINGS

In the following, embodiments of the invention are described in more detail with reference to the accompanying drawings.

DETAILED DESCRIPTION OF THE PREFERRED EMBODIMENTS

Figure 1A:
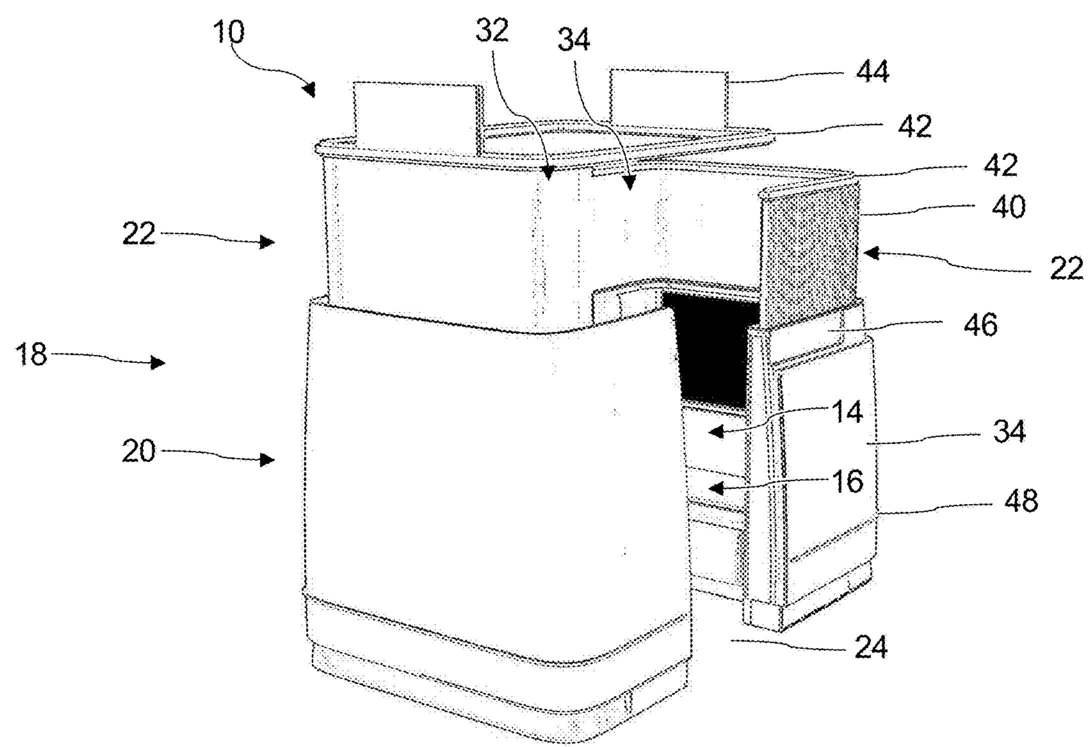
FIG. 1*a* shows a perspective view of a first example of a passenger compartment with wall sections that are designed as hybrid walls and have a lower and an upper wall segment. The upper wall segment is variable in such a way that permeability in this area is modifiable. In the left-hand area, the upper wall segment is open; a door area is also open. The passenger compartment is intended, for example, for a central, i.e., interior, area of an aircraft cabin.

FIG. 1*a* shows a perspective view of a first example of a passenger compartment 10 for an aircraft cabin. The passenger compartment 10 has an enclosing wall 12 and a compartment space 14 formed by the enclosing wall 12, in which compartment space at least one passenger seating device 16 is arranged. The enclosing wall 12 has wall sections 18 which extend from the floor at least to the head height of a standing passenger. At least a part of the wall sections 18 is formed as hybrid walls, each having a lower wall segment 20 and an upper wall segment 22, wherein the lower wall segment 20 is formed fixed and the upper wall segment 22 is formed variable, so that a permeability in this area is modifiable.

The passenger compartment 10 is intended, for example, for a central, i.e. inner, area of an aircraft cabin.

In an option, it is provided that the enclosing wall 12 comprises a door area 24. An access opening to the compartment space 14 is formed in the door area 24 and the access opening is closeable with a movable door device 26 (see FIG. 1*b*).

As a further option, it is provided that the door device 26 has a lower door segment 28 and an upper door segment 30 which are movable independently from each other.

Figure 1B:
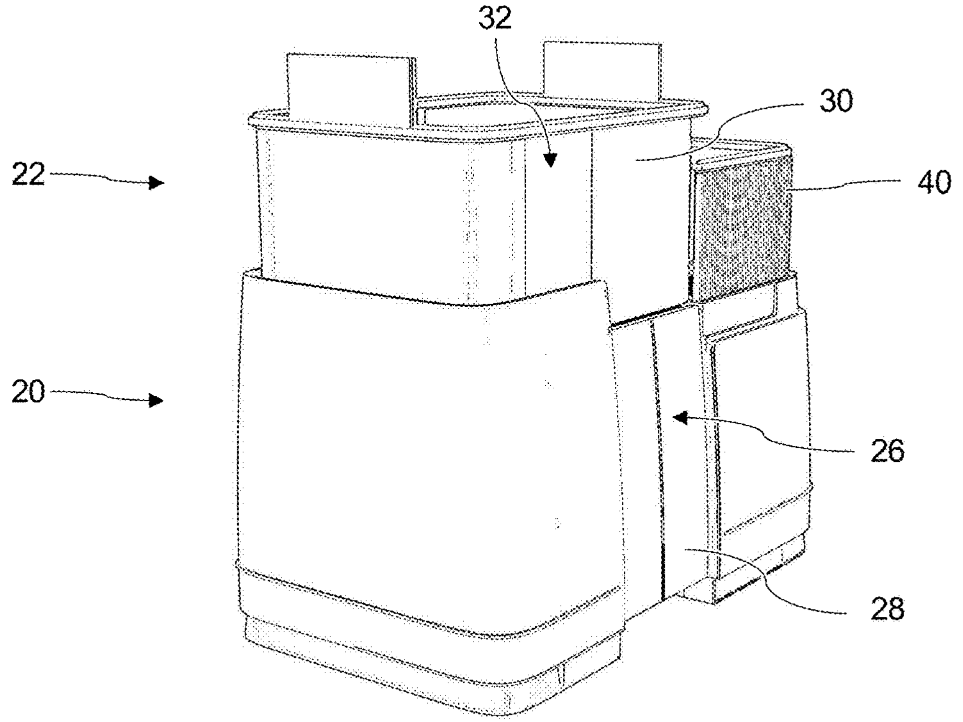
FIG. 1*b* shows the passenger compartment of FIG. 1*a* with the door area closed.

FIG. 1*b* shows the passenger compartment 10 of FIG. 1*a* with the door area closed.

For example, the lower door segment 28 has two door elements, for example two sliding door segments.

In an example, the lower door segment 28 has at least one fixed door element. For example, the lower door segment 28 is formed as a movable fixed wall shell analogous to the lower wall section 20.

In an example, the upper door segment 30 is designed as a movable closing element. For example, analogous to the lower door segment 28, the upper door segment 30 is designed as a horizontally slidable closure element, as a foldable closure element, as a horizontally slidable curtain, as vertical slats or as a horizontally windable roller blind.

In an example, the upper door segment 30 has at least one fixed door element. For example, the lower door segment 28 is designed as a movable fixed wall shell.

In an example, the upper door segment 30 has a door element that is different from the fixed door element.

The term "head height" refers to a standing person, for example of the 95th percentile. In an example, the wall sections 18 extend from the floor to a height of at least 150 cm, for example to at least 160 cm or for example to at least 170 cm. In an example, a height of at least 180 cm is provided.

In another example, the walls extend to 190 cm or 200 cm or even 210 cm.

In an example, the walls extend up to approx. 2 cm or 5 cm or 10 cm to fixtures above the compartment or to the ceiling cladding.

In another example, the walls extend up to the fixtures above the compartment or up to the ceiling paneling.

The term "enclosing wall" refers to the walls, i.e. wall parts, which enclose the compartment space, i.e., spatially delimit it from the surrounding cabin space of the aircraft. The enclosing wall 12 is the building structure that forms the compartment space 10. The enclosing wall 12 forms an enveloping surface to separate a portion of the cabin space of the aircraft cabin from the rest of the cabin space, for example from other seating areas, the aisle area or from other compartments within the aircraft cabin. The enclosing wall 12 may also be referred to as a wall, wall structure, wall segment arrangement, enclosure, envelope structure, partition structure or separating structure.

The lower wall segment 20 can be formed with a continuous wall surface or have various partial surfaces that form a fixed structure.

The upper wall segment 22 may be formed with a movable surface or may have various partial surfaces that are at least partially movable.

The wall sections of the enclosing wall 12 may also be referred to as wall segments. The lower wall segment may be referred to as the lower wall area and the upper wall segment may be referred to as the upper wall area.

In an option, it is provided that the enclosing wall 12 circumferentially surrounds the compartment space 14.

The enclosing wall 12 surrounds the compartment space 10 on all sides. In a first option, the enclosing wall 12 connects upwards to the cabin lining of the aircraft cabin, for example to a ceiling structure or to storage compartment arrangements or also to other fixtures in the aircraft cabin, such as a crew rest compartment arranged in the upper area, i.e., a rest compartment for the personnel, i.e., for the flight attendants and the pilots. In a second option, the enclosing wall 12 also comprises an upper connection.

In an alternative option, it is envisaged that the enclosing wall 12 does not surround the compartment space on all sides and instead wall structures present in the aircraft cabin are included in the enclosing wall 12 and assume the function of the enclosing wall 112 to surround the compartment space. For example, when arranged along an outer wall, the cabin wall structure may form part of the enclosing wall 12. Another example of existing wall structures are monuments present in the aircraft cabin, such as lavatories, i.e., toilets and washrooms, or galleys, i.e., galleys, or partitions and the walls of other compartment spaces.

The enclosing wall 12 can also have additional openings in the lower area. For example, when arranged along an outer wall of an aircraft, a longitudinally extending opening can be provided in order to include the windows of the outer wall. For example, when arranged in the central area along aisle zones, a longitudinally extending opening in the form of a window opening can be provided. The window opening can be fixed and, for example, closed with a translucent filling. The window opening can also be openable and closeable by a closing element.

In an option, it is provided that the permeability for air and light in the upper wall segment 22 of the wall sections 18 formed as hybrid walls is modifiable.

In an option, it is provided that in the wall sections formed as hybrid walls, the upper wall segment 22 has a movable closure device 32 with which an opening 34 of the enclosing wall 12 is closeable.

The upper wall segment 22 has, for example, a movable closing element, or several movable closing elements.

In an option, it is provided that the movable closure device 32 is movable between a closure position and an opening position. In one variant, the opening 34 is closed by the closure device 32 in the closure position in a nontransparent manner and is at least partly transparent in the opening position. In an alternative or additional variant, the opening 34 is acoustically attenuatingly closed by the closure device 32 in the closure position compared to the opening position. In a further alternative or additional variant, an air exchange between the compartment space 14 and an adjacent surrounding of the aircraft cabin via the opening 34 is reduced by the closure device 32 in the closure position compared to the opening position.

The opening 34 is closed by the movable closure device 32 in the closure position and released in the opening position.

In a first option, the movable closure device 32 creates a visual boundary between the compartment space 14 and the adjacent surroundings of the aircraft cabin. In the opening position, for example, a view through from the aircraft cabin into the compartment space 14 is possible, and vice versa, whereas in the closure position a view through is not possible.

In a second option, the movable closure device 32 creates an acoustic boundary between the compartment space 10 and the adjacent surroundings of the aircraft cabin. In the closure position, for example, a sound input from the aircraft cabin into the compartment space 10 is possible, and vice versa, reduced, i.e. at least reduced, whereas in the opening position an acoustic exchange via the opening is virtually unhindered.

In a third option, the movable closure device 32 has the effect of reducing the air exchange between the compartment space 14 and the adjacent surroundings of the aircraft cabin. In the closure position, for example, an air exchange from the aircraft cabin into the compartment space 14, and vice versa, is possible, reduced, i.e., at least reduced, whereas in the opening position an air exchange via the opening is virtually unhindered.

In an option, it is provided that the enclosing wall 12 has at least two adjacent upper wall segments of two sides of the compartment space 14 which are adjacent to each other in a horizontal direction, and which can be opened in such a way that an opening is formed which extends at least partially over the two adjacent sides of the compartment space 14.

In an option, the lower wall segment 20 is provided to extend from the floor to at least above a seated person's head height. In an option, the upper wall segments 22 extend up to the cabin ceiling or up to fixtures in the ceiling area of the cabin.

As an option, it is provided that the enclosing wall 12 of the passenger compartment 10 has air gaps or other openings relative to the cabin space which ensure an air exchange. For example, the upper wall segments 22 do not extend all the way to the ceiling areas, but form joints or gaps that can not only offer visual advantages, but also enable air exchange when the arrangement is closed.

On the one hand, the air exchange is intended to ensure a sufficient air supply to the compartment space 14; on the other hand, the air exchange also ensures that the walls 12 do not deform unintentionally in the event of a sudden drop in pressure in the cabin.

For example, the lower wall segment 20 extends to a height of approximately 120 cm. In an example, the lower wall segment 20 extends to a height of approximately 130 cm. In another example, the lower wall segment extends to a height of approximately 140 cm. In another example, the lower wall segment 20 extends to a height of approximately 150 cm.

The lower wall segment 20 is dimensioned in height so that the compartment space 14 provides a certain amount of protection for a person sitting in it and at the same time a person standing can look out of the compartment space 14 into the aircraft cabin, and a person standing in the aircraft cabin can look into the compartment space 14 in the horizontal viewing direction when the upper wall segments are open.

In an option, the wall segments extend up to the head height of a standing passenger from the 95th percentile group.

In an example, the wall sections of a passenger compartment have the same height.

For example, the lower wall segments 20 are of the same height, and the upper wall segments 22 are also of the same height and thus end at the same height.

For example, the lower wall segments 20 are of different heights, and the upper wall segments 22 are also of different heights, but end at the same height.

In another example, the wall sections of a passenger compartment 10 are of different heights.

For example, the lower wall segments 20 are of the same height, and the upper wall segments 22 are of different heights and end at different heights.

For example, the lower wall segments 20 are of different heights, and the upper wall segments 22 are of the same height, but end at different heights.

For example, the lower wall segments 20 are of different heights, and the upper wall segments 22 are also of different heights and end at different heights.

In an option, it is provided that the lower wall segment 20 has a fixed wall shell 35. Alternatively or additionally, the upper wall segment 22 is resilient over at least half of its area when the opening is closed.

In an example, the lower wall segments 20 of a passenger compartment 10 are of the same height.

In another example, the lower wall segments 20 of a passenger compartment 10 are of different heights. For example, the wall segments of one side are formed with the same height throughout, but are of different heights compared to the other sides. For example, the lower wall segments 20 of one side are of different heights.

The fixed wall shell 35 of the lower wall segment 20, also referred to as the lower wall shell, serves to shield the compartment from the surroundings. The lower wall shell is designed, for example, as a plastic shell, similar to a monument. The lower wall shell is designed to be so solid, for example, that a person accidentally leaning against it from the outside will not cause the fixed wall shell to deform. A user in the compartment should preferably not even notice the leaning from the outside.

In the closed position, the resilient upper wall segment 22 is intended on the one hand to seal off the compartment 10 from the cabin space, but on the other hand not to repel the rest of the cabin space too much. A resilient structure, for example a curtain or other flexible material, also provides a pleasant impression when touched by, for example, people who are in front of or in the compartment and come into contact with the segment.

Figure 4A:
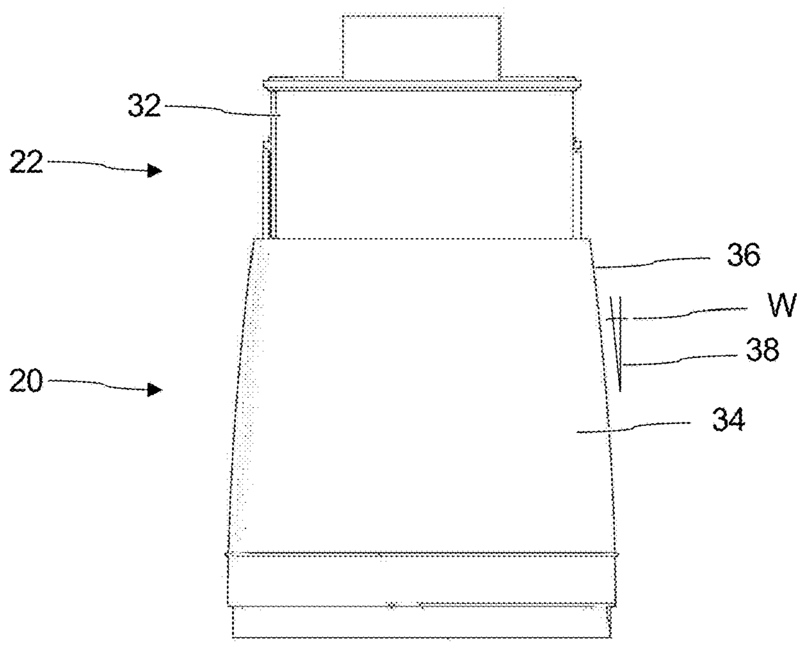
FIG. 4*a* shows a side view of the passenger compartment of FIG. 1*a* or FIG. 1*b* from the left-hand narrow side of the compartment (in relation to FIG. 2).

In an option, it is provided that in at least some of the wall sections 18, the lower wall segment 20 is inclined in its vertical extension from the floor towards the compartment space (see FIG. 4*a*). An outer contour 36 of the compartment forms an angle W with a vertical 38.

The wall shell 35 can therefore be curved outwards in the lower area as seen from the interior, which offers additional storage options and also additional space for movement, for example for reclining passengers.

In an aisle adjacent to the compartment, on the other hand, the space in the lower area is not needed as much as the space further up, for example in the upper body and especially shoulder area of people who are walking or standing in the aisle.

For example, the wall section can accommodate movable table segments or seating. However, checkroom areas, storage compartments or other service functions can also be accommodated here.

The passenger compartment 10 has, for example, stowable beds. For example, beds with box-spring frames or box-spring mattresses can be provided, for example with extra thick mattresses.

In an option, the upper wall segment 22 is provided with a horizontally slidable curtain 40. For example, the curtain 40 is guided in curtain rails 42.

In an example, the curtain rails 42 are supported by supports on the lower wall segment 20.

In another example, the curtain rails 42 are suspended from the ceiling or fixtures in the head area, for example by means of holders 44.

In an option, the curtain rail 42 is also provided for the arrangement of lighting devices. For example, light sources extending linearly along the curtain rail, such as LED strips. When the curtain is closed, the lighting can also be provided on both sides of the curtain rail 42 and can be controlled separately.

The upper wall segment 22 is designed such that it can be variably positioned along the path of movement, regardless of whether it is designed as a curtain or other element.

As an option, the curtain 40 can be designed for privacy and soundproofing. As a further option, the curtain 40 can also be designed for darkening and have an opaque material, for example. In one variant, the curtain 40 is translucent, i.e., translucent but not transparent.

In an option, it is provided that the curtain 40 is held movably at the top on a rail and is guided in the lower area in a receptacle on the lower fixed wall shell. As an option, it is provided that the curtain has vertically extending reinforcement areas.

The lower wall segment 20 has, for example, recesses 46, which are used, for example, to arrange light sources or information display devices.

The lower wall segment 20 has optional decorative strips 48 which, for example, prevent trolleys from touching the surfaces of the lower wall section.

In an option, it is provided that the upper wall segment 22 has at least one element from the group comprising:

- a horizontally slidable closure element;
- a foldable closure element having a plurality of vertically running folding axes;
- vertical slats rotatable about a vertical axis and optionally also horizontally displaceable;
- a roller blind windable in a horizontal direction on a vertical axis; and
- a roller blind windable in a vertical direction on a horizontal axis.

The horizontally slidable closure element can, for example, be a roll closure device composed of vertical segments.

A vertically movable locking element can also be provided as a further option.

FIG. 1*a* shows both the door area open and the left-hand part of the upper wall segment 22. The curtain on the right-hand side can also still be opened.

Figure 2:
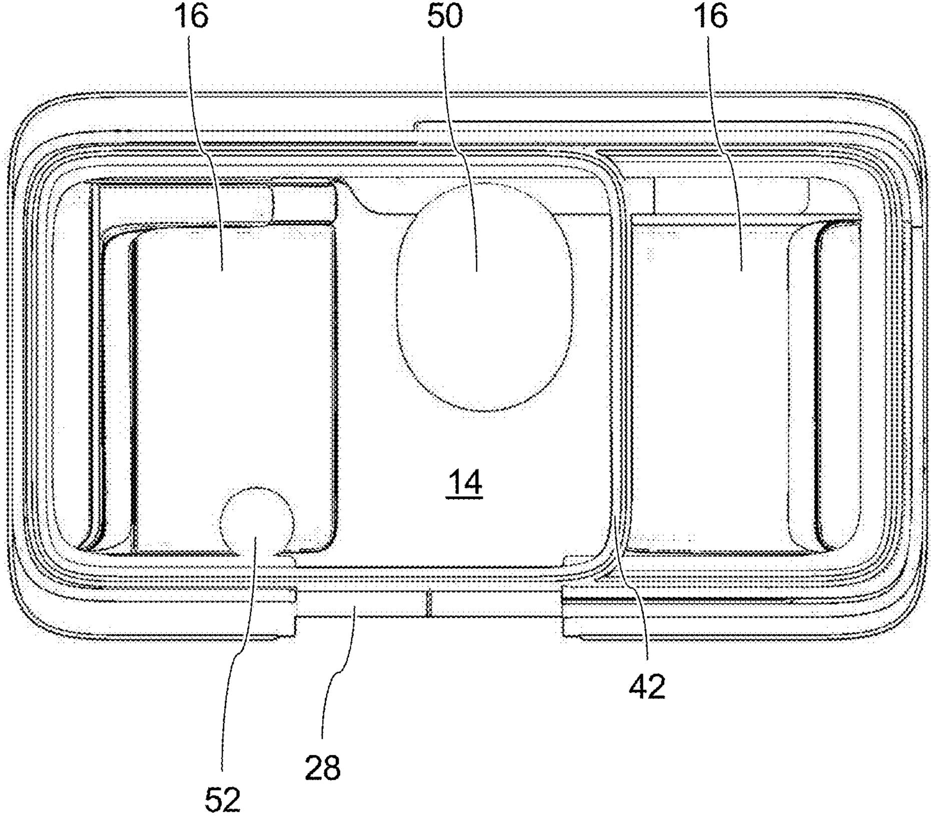
FIG. 2 shows a top view of the passenger compartment of FIG. 1*b*.

FIG. 2 shows a top view of the passenger compartment of FIG. 1*b*. In addition to two seating devices 16, a central table 50 and a side storage surface 52 are also shown.

Figure 3A:
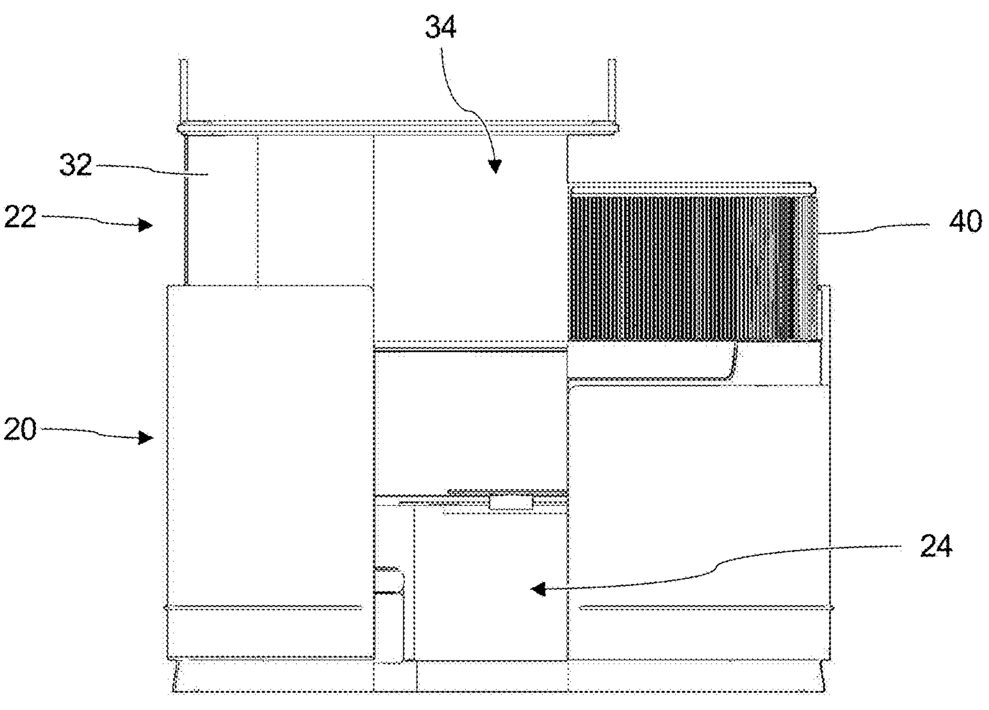
FIG. 3*a* shows a front view of the passenger compartment of FIG. 1*a*, for example from a longitudinal aisle area of an aircraft cabin.
Figure 3B:
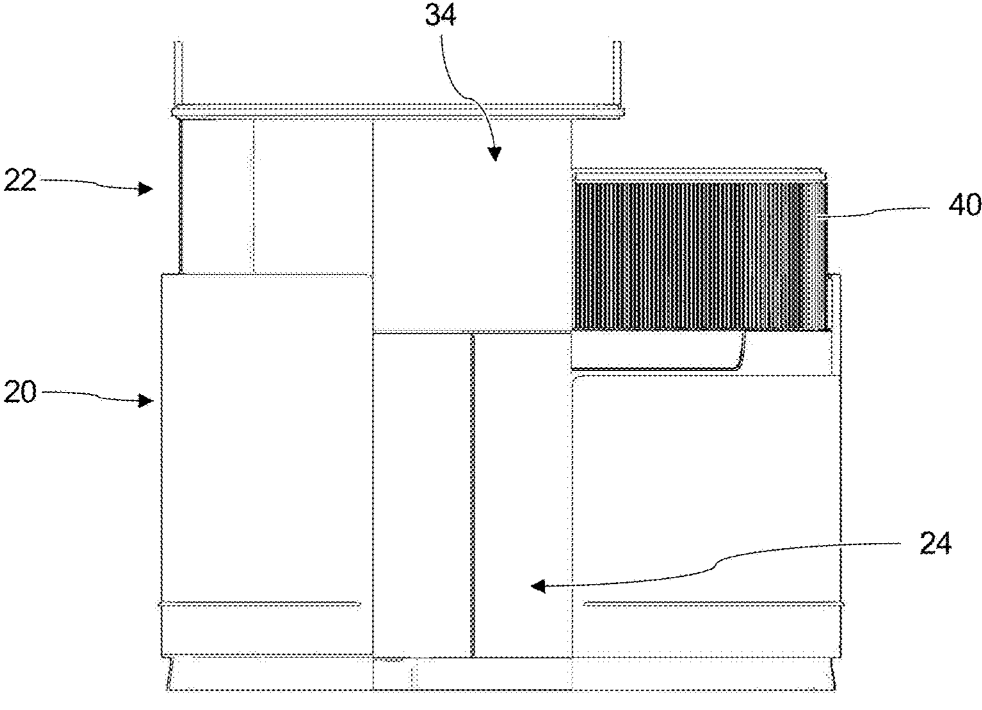
FIG. 3*b* shows a view of the passenger compartment of FIG. 1*b*.

FIG. 3*a* shows a (front) view of the passenger compartment of FIG. 1*a*, for example from a longitudinal aisle area of an aircraft cabin. Both the door area 24 and the upper left wall section are open. FIG. 3*b* shows a view of the passenger compartment of FIG. 1*b*. Both the door area 24 and the upper left wall section are now closed.

Figure 4B:
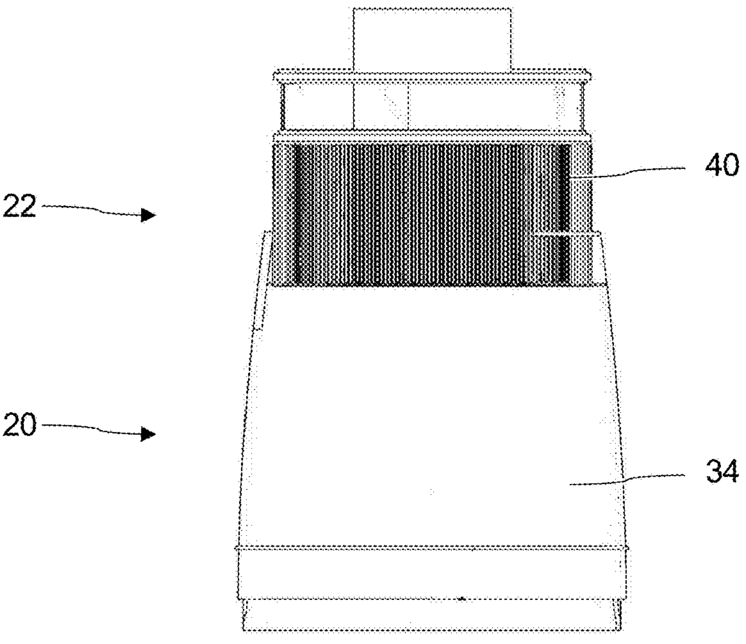
FIG. 4*b* shows a side view of the passenger compartment of FIG. 1*a* or FIG. 1*b* from the right-hand narrow side of the compartment (in relation to FIG. 2).

FIG. 4*a* shows a (side) view of the passenger compartment of FIG. 1*a* or FIG. 1*b* from the narrow left-hand side of the compartment (in relation to FIG. 2). FIG. 4*b* shows a (side) view of the passenger compartment of FIG. 1*a* or FIG. 1*b* from the right-hand narrow side of the compartment (in relation to FIG. 2). The lateral inclination of the lower wall segments 20 on both sides is clearly visible. Depending on the adjacent fixtures or areas, the inclination can also be provided on one side only.

Figure 5A:
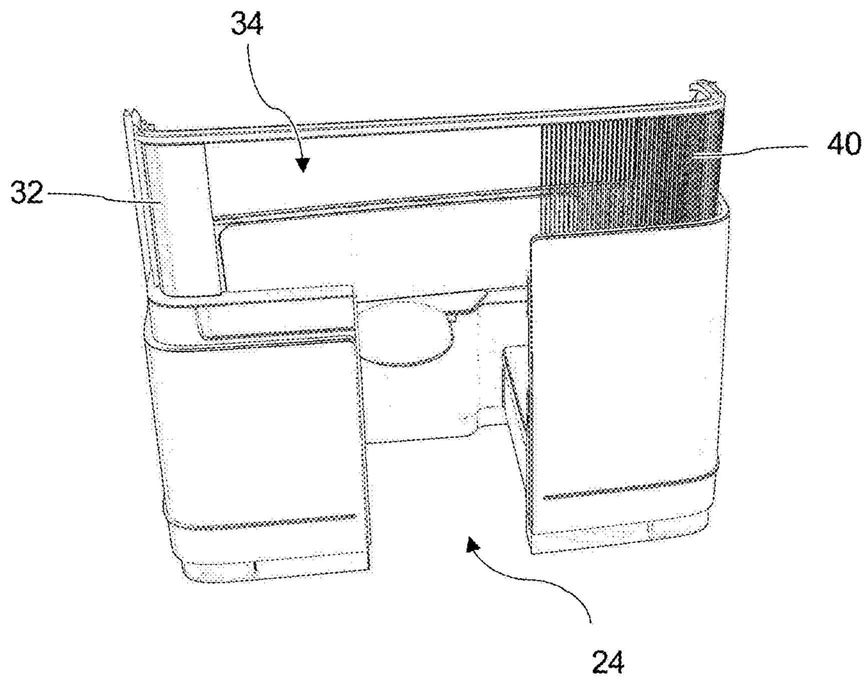
FIG. 5*a* shows a perspective view of a second example of a passenger compartment with wall sections designed as hybrid walls. The passenger compartment is intended, for example, for a lateral area of an aircraft cabin, i.e., running along the outer wall. The upper wall segments are open in the left-hand section; the door area is also open.
Figure 5B:
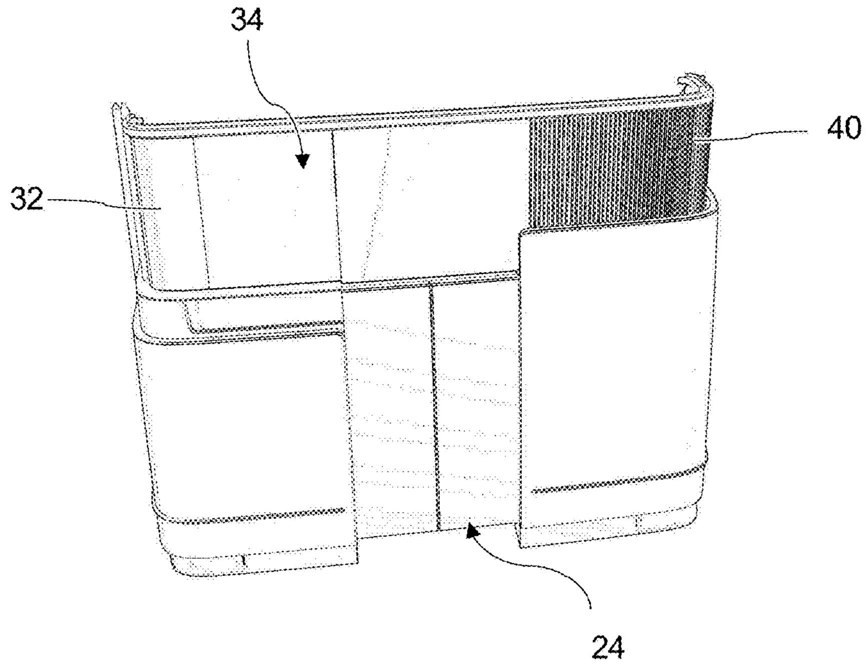
FIG. 5*b* shows the passenger compartment of FIG. 5*a* with the upper wall segments closed and the door area closed.

FIG. 5*a* shows a perspective view of a second example of a passenger compartment with wall sections designed as hybrid walls. The passenger compartment is provided, for example, for a lateral area of an aircraft cabin, i.e., running along the outer wall. The upper wall segments 22 are open in the left-hand part; the door area 24 is also open. FIG. 5*b* shows the passenger compartment of FIG. 5*a* with closed upper wall segments 22 and with closed door area 24.

Figure 6:
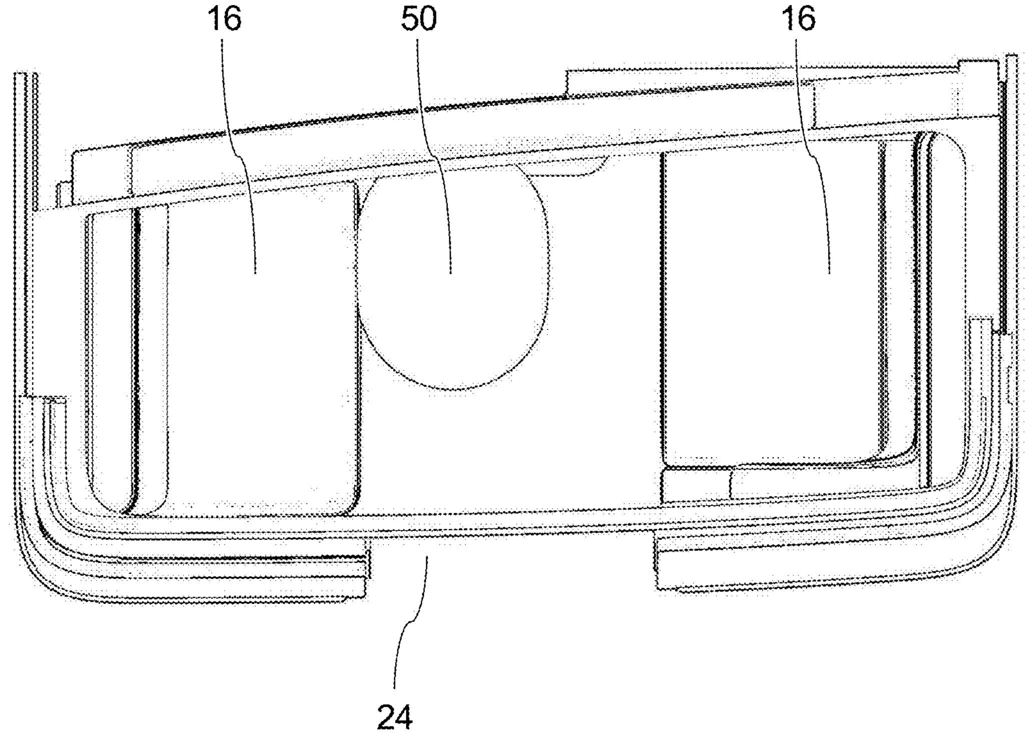
FIG. 6 shows a top view of the passenger compartment of FIG. 5*b*.

FIG. 6 shows a top view of the passenger compartment of FIG. 5*b*.

Figure 7A:
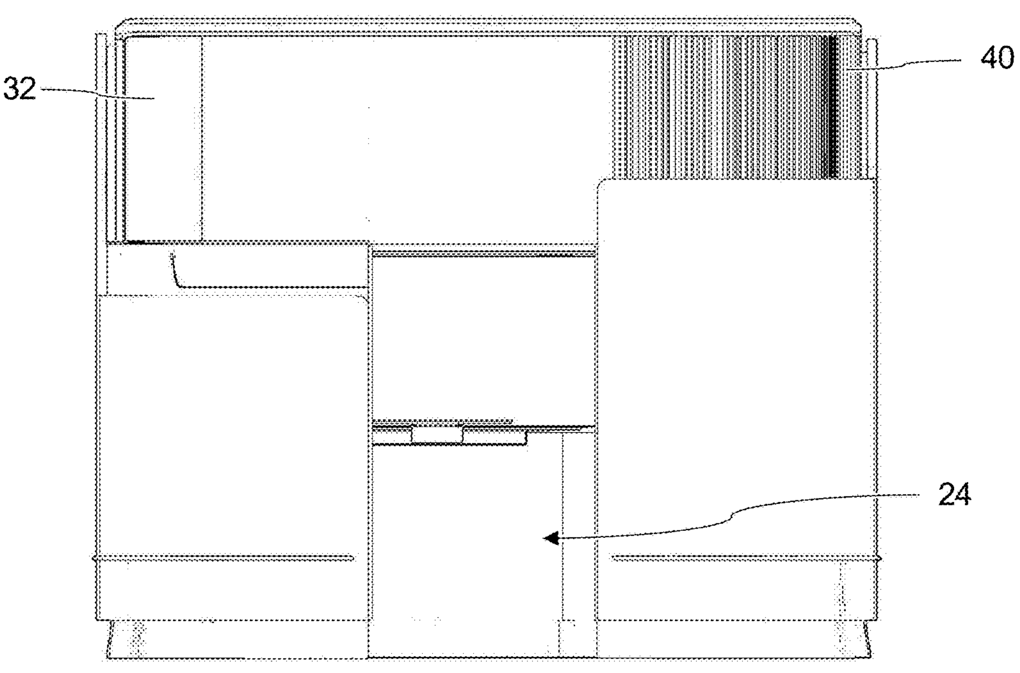
FIG. 7*a* shows a front view of the passenger compartment of FIG. 5*a*, for example from a longitudinal aisle area of an aircraft cabin.
Figure 7B:
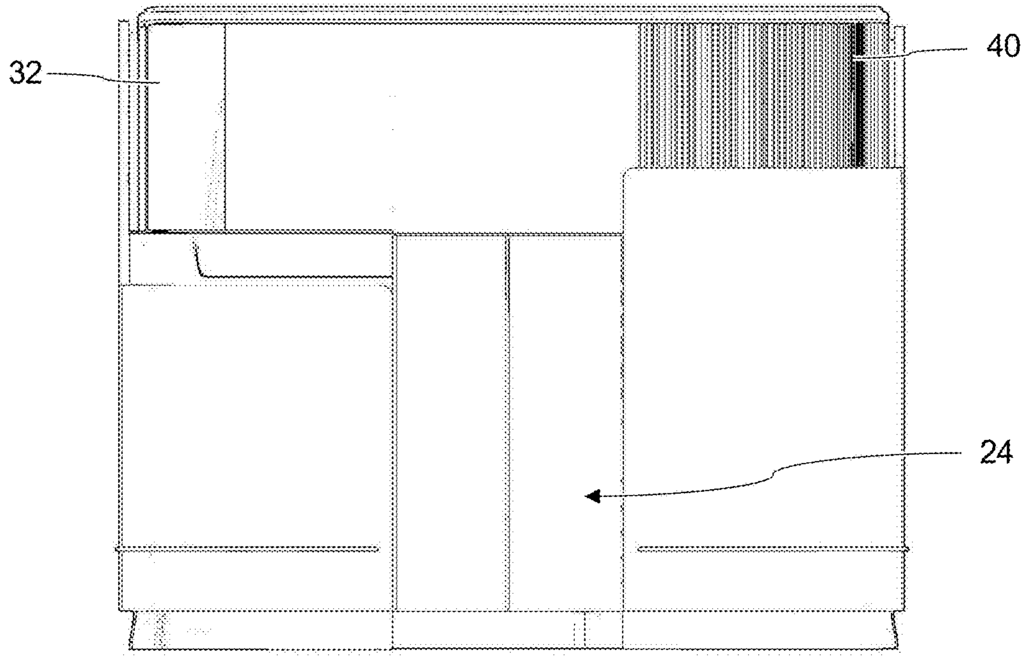
FIG. 7*b* shows a view of the passenger compartment of FIG. 5*b*.

FIG. 7*a* shows a (front) view of the passenger compartment of FIG. 5*a*, for example from a longitudinal aisle area of an aircraft cabin. The door area 24 and the upper left wall section are open. FIG. 7*b* shows a view of the passenger compartment of FIG. 5*b*. The door area 24 and the upper left wall section are closed.

Figure 8A:
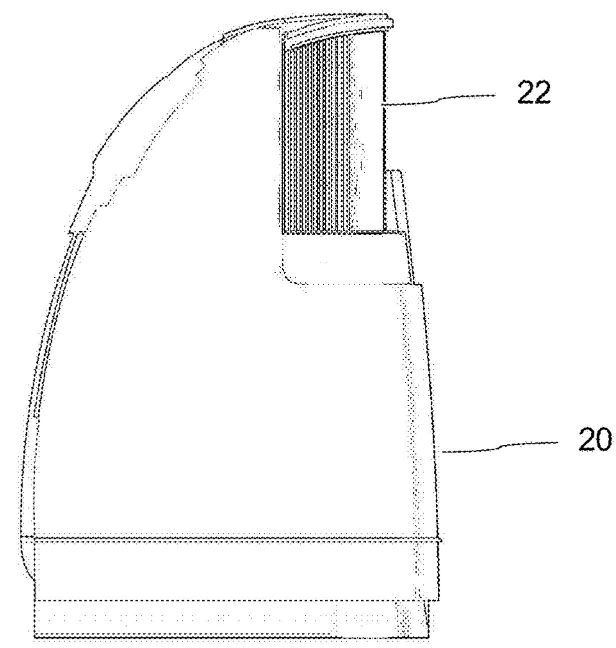
FIG. 8*a* shows a side view of the passenger compartment in FIG. 5*b* from the narrow left-hand side of the compartment (in relation to FIG. 6).
Figure 8B:
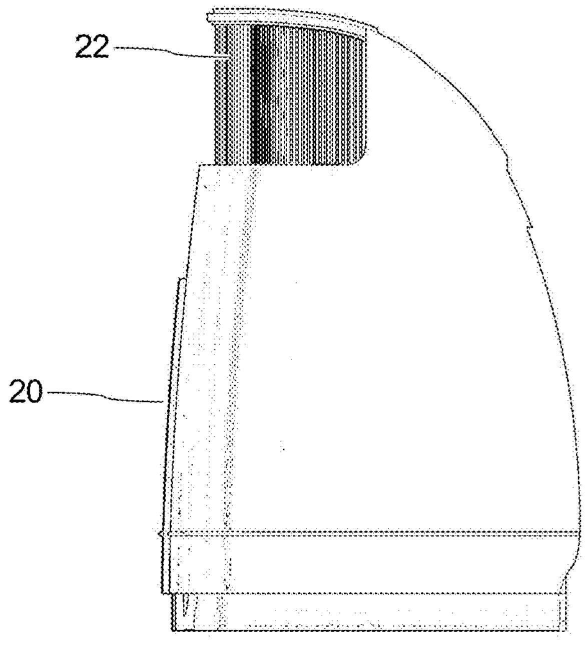
FIG. 8*b* shows a side view of the passenger compartment in FIG. 5*b* from the right-hand narrow side of the compartment (in relation to FIG. 6).

FIG. 8*a* shows a (side) view of the passenger compartment of FIG. 5*b* from the narrow left-hand side of the compartment (in relation to FIG. 6). FIG. 8*b* shows a (side) view of the passenger compartment of FIG. 5*b* from the right-hand narrow side of the compartment (relative to FIG. 6). The lateral inclination of the lower wall segment 20 on one side is clearly visible. The other side is adapted to the contour of the cabin wall in order to fit snugly against it.

Figure 9:
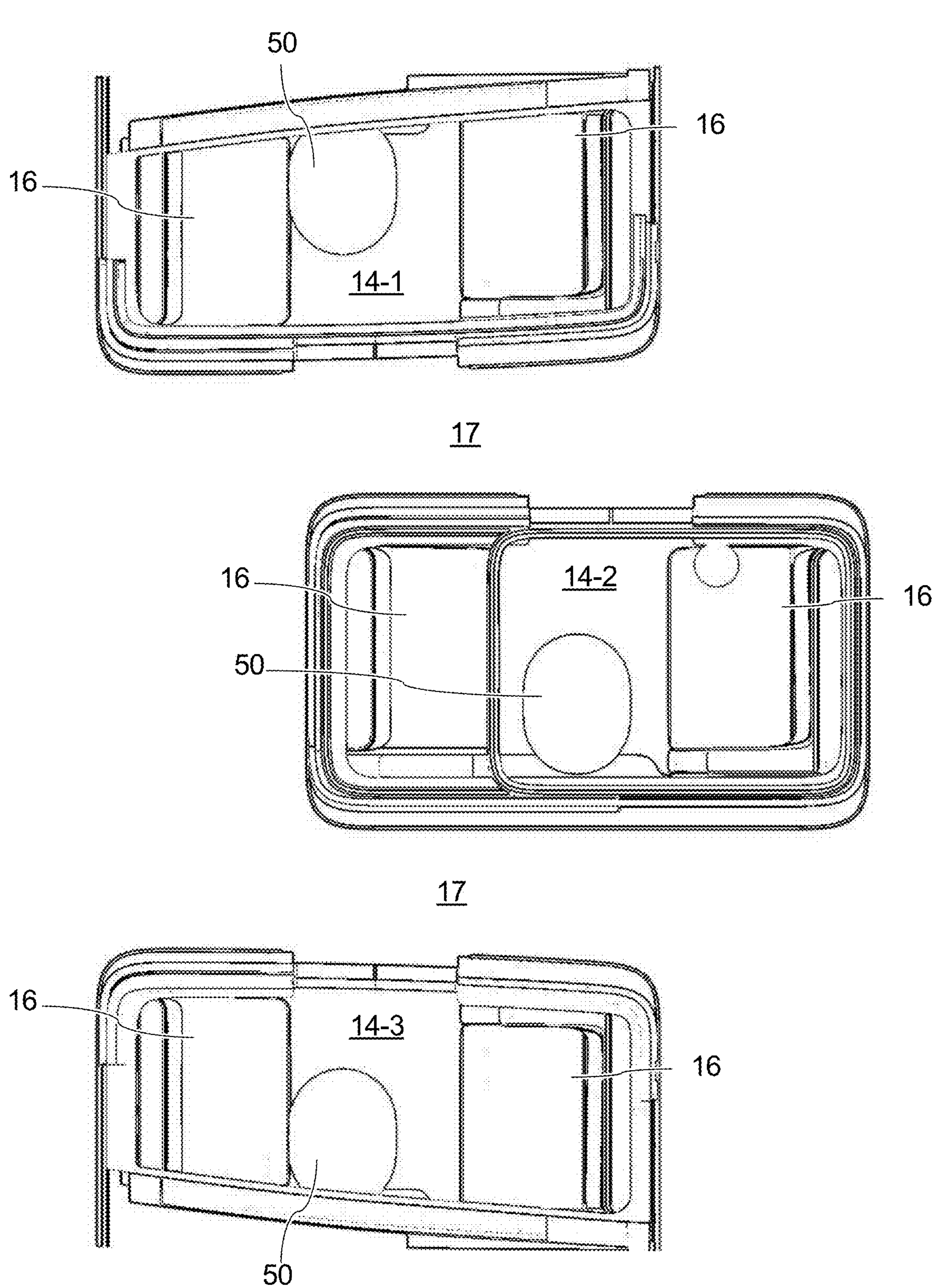
FIG. 9 shows a top view of an arrangement of several passenger compartments: at the top and bottom of the illustration, a passenger compartment is shown in each case, which fits snugly against the outer wall of an aircraft cabin; in the middle, a passenger compartment for a central, i.e., inner, area of an aircraft cabin is shown.

FIG. 9 shows a top view of an arrangement of several passenger compartments: at the top and bottom of the illustration, a passenger compartment with a cabin space 14-1 and 14-3 is shown in each case, in which the passenger compartment nestles against the outer wall of an aircraft cabin; in the middle, a passenger compartment with a cabin space 14-3 for a central, i.e. inner, area of an aircraft cabin is shown. Aisle areas 17 are provided between the passenger compartments.

Figure 10:
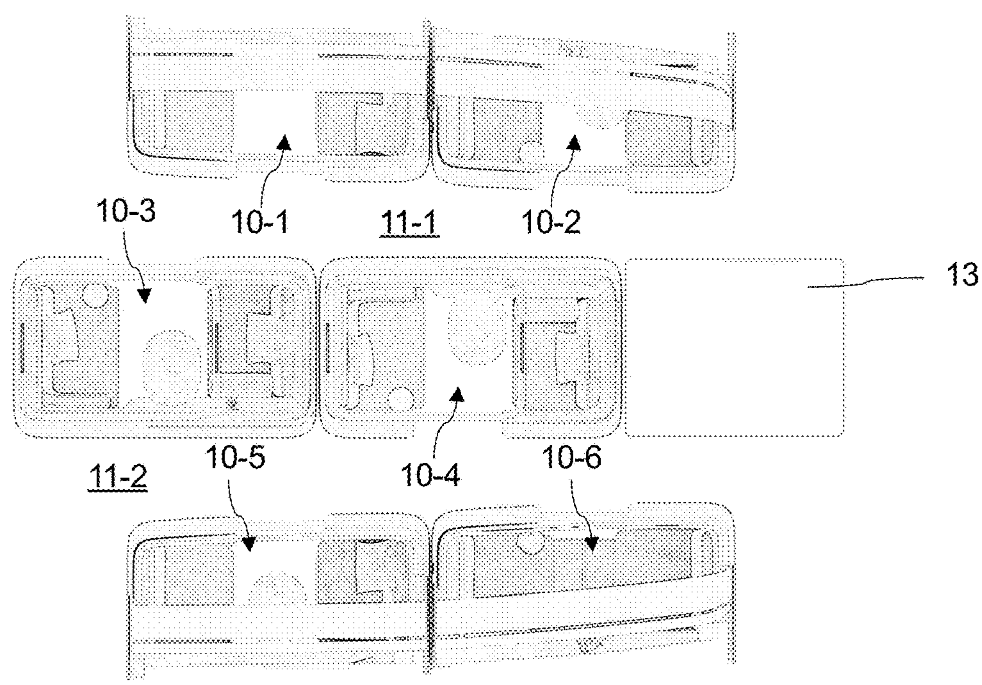
FIG. 10 shows a top view of another arrangement comprising several passenger compartments: Several of the passenger compartments along the outer wall as well as of the passenger compartments in the central area can be provided one behind the other (in the direction of flight). The passenger compartments can also be provided in combination with other monuments.

FIG. 10 shows a top view of another arrangement comprising several passenger compartments. Both the passenger compartments along the outer wall and the passenger compartments in the central area can be arranged one behind the other (in the direction of flight). The passenger compartments can also be provided in combination with other monuments. In FIG. 10, a first passenger compartment 10-1 and a second passenger compartment 10-2 are shown in an upper row. Below this (with reference to the drawing) is a first aisle 11-1. In a middle row, a third passenger compartment 10-3 and a fourth passenger compartment 10-4 are shown. To the right of the fourth passenger compartment 10-4, a monument 13 is shown, for example a sanitary compartment. Below this is a second aisle 11-2. In a lower row, a fifth passenger compartment 10-5 and a sixth passenger compartment 10-6 are shown. The passenger compartments can be of the same or different design. The two passenger compartments in the upper and lower rows are designed as outer wall compartments; the passenger compartments in the middle row are designed as center compartments. The passenger compartments can be equipped differently or identically, particularly in the compartment space.

Figure 11:
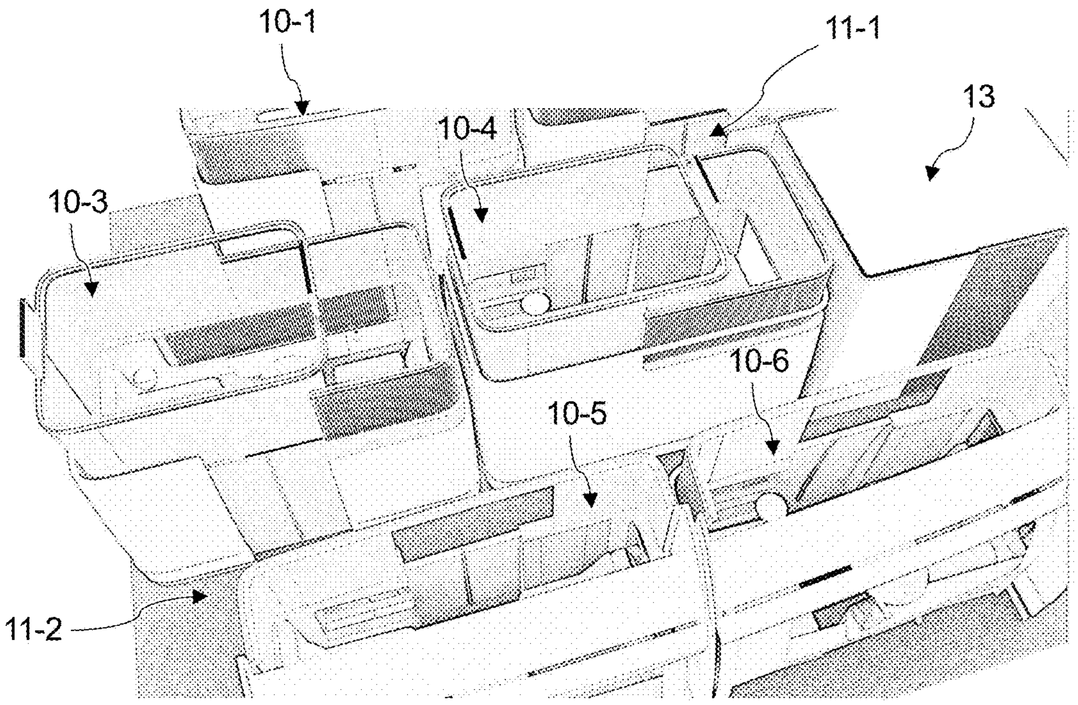
FIG. 11 shows a perspective view of the arrangement of several passenger compartments of FIG. 10.

FIG. 11 shows a perspective view of the arrangement comprising the several passenger compartments of FIG. 10.

Figure 12:
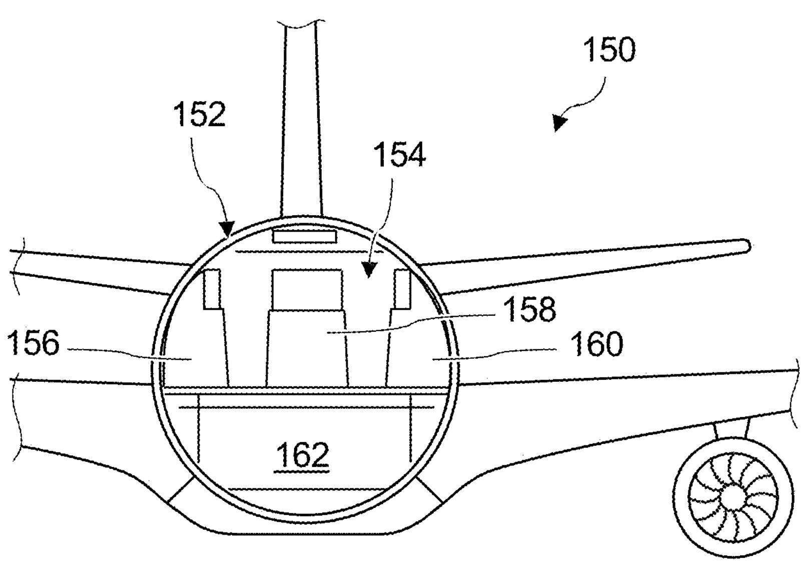
FIG. 12 shows an example of an aircraft with a fuselage and an aircraft cabin formed in the fuselage. At least one passenger compartment according to one of the preceding examples is provided in the aircraft cabin, for example a plurality of passenger compartments, for example side and center passenger compartments.

FIG. 12 shows an example of an aircraft 150 having a fuselage 152 and an aircraft cabin 154 formed in the fuselage 152. At least one example of the passenger compartment 10 according to one of the preceding examples is provided in the aircraft cabin 154, for example a plurality of passenger compartments, for example a first side passenger compartment 156, a center passenger compartment 158 and a second side passenger compartment 160.

FIG. 12 also shows a cargo hold 162 below the aircraft cabin 154 as an option.

In a variant, a plurality of passenger compartments is provided according to one of the preceding examples. The passenger compartments are provided, for example, along one or more aisle areas. The passenger compartments may additionally be provided in combination with seating areas or other cabin fixtures such as lavatories, i.e., toilet arrangements, or galleys, i.e., galleys.

Figure 13:
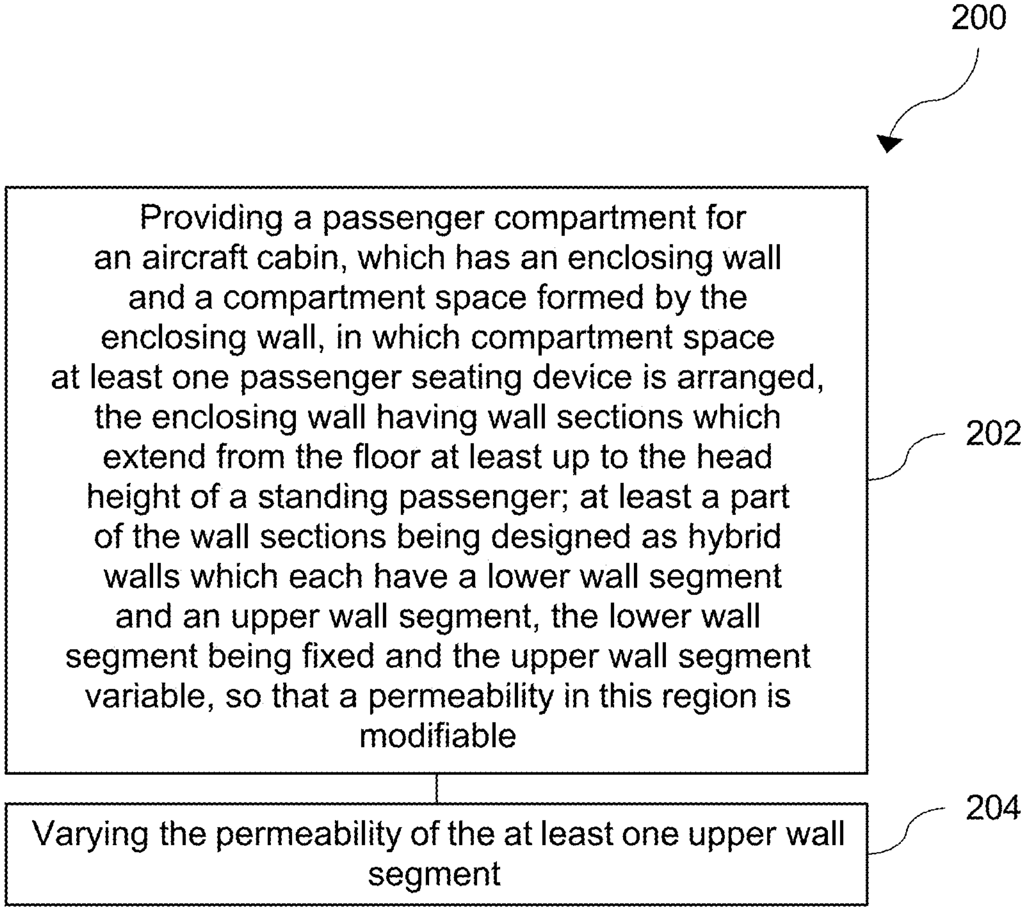
FIG. 13 shows steps of an example of a method for adapting an aircraft cabin compartment.

FIG. 13 shows steps of an example of a method 200 for adapting an aircraft cabin compartment. The method comprises the following steps:

a) Providing 202 an example of the passenger compartment 10 according to one of the preceding examples; and b) Varying 204 the permeability of the at least one upper wall segment 22.

Figure 14A:
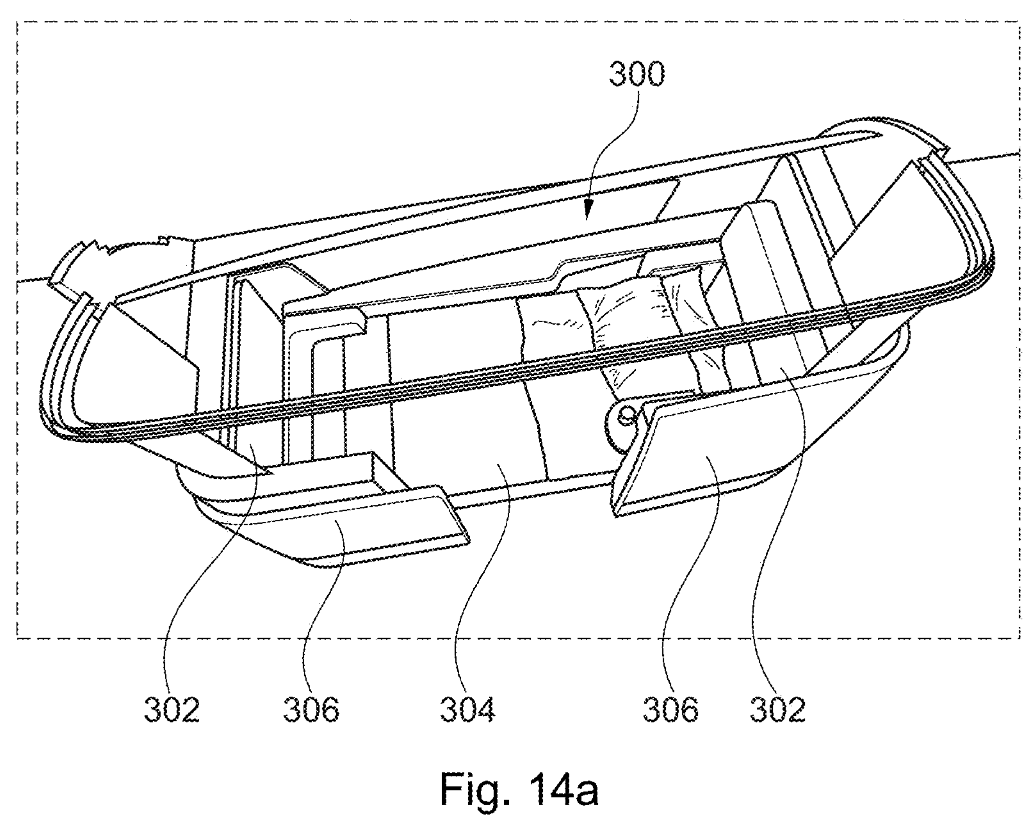
FIG. 14*a* shows a graphic representation of another example of a passenger compartment arranged along the outer wall with open upper wall segments and an open-door area.
Figure 14B:
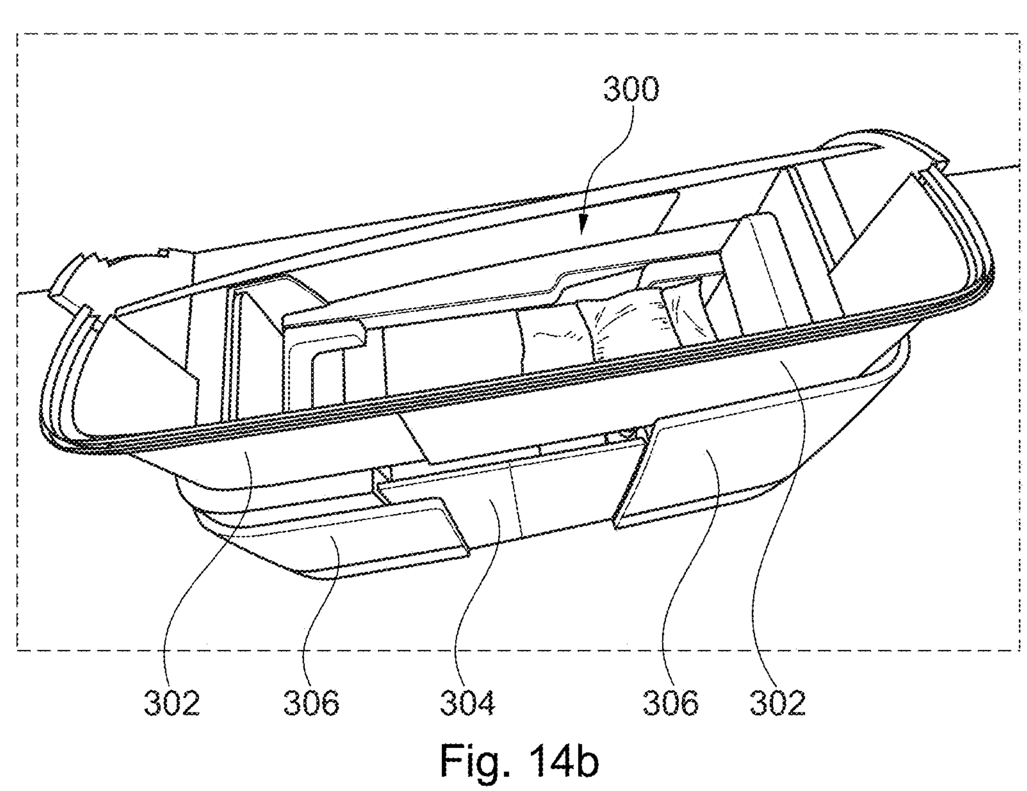
FIG. 14*b* shows the passenger compartment of FIG. 14*a* with closed upper wall segments and closed-door area.

FIG. 14*a* shows a graphic representation of a further example of a passenger compartment 300 arranged along the outer wall with open upper wall segments 302 and an open-door area 304. Below the upper wall segments, lower wall segments 306 are formed as shell-like wall areas. Upper and lower wall segments can be formed identically or differently on both sides of the door area. FIG. 14*b* shows the passenger compartment 300 of FIG. 14*a* with closed upper wall segments 302 and closed-door area 304.

Figure 15A:
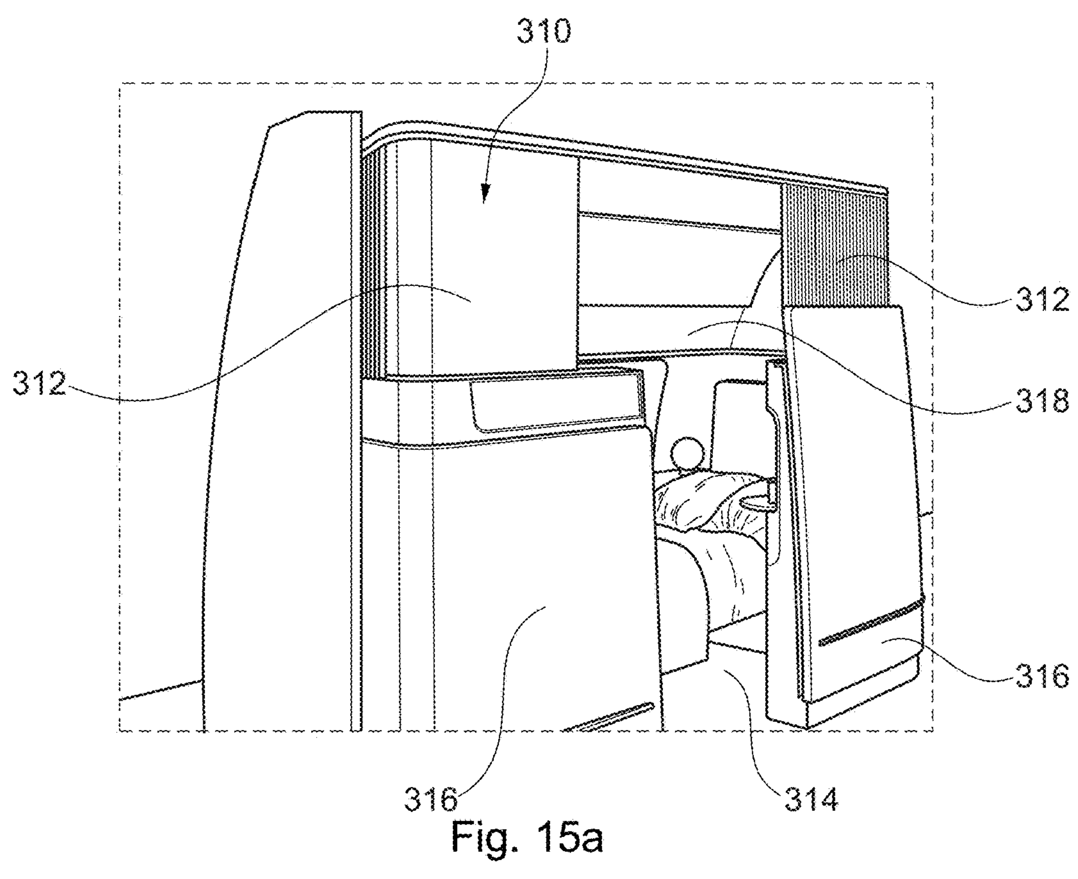
FIG. 15*a* shows a perspective view of another example of a passenger compartment arranged along the outer wall with partially open upper wall segments and an open-door area.
Figure 15B:
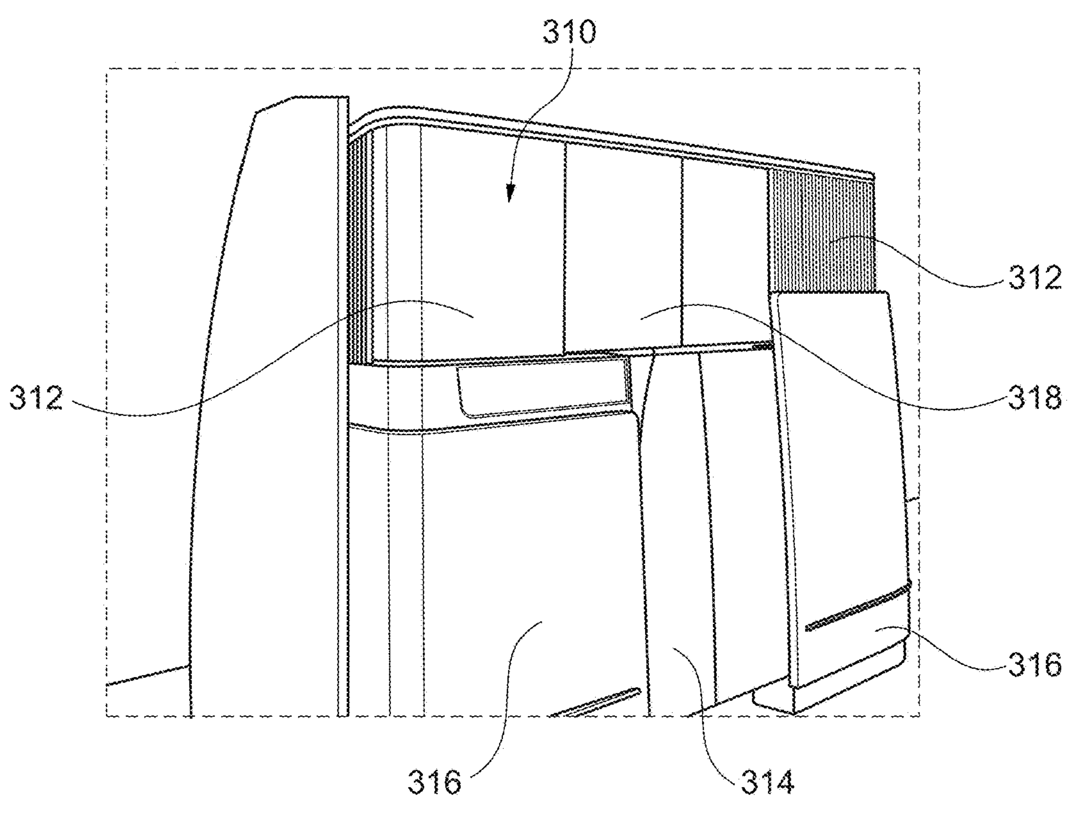
FIG. 15*b* shows the passenger compartment from FIG. 15*a* with closed upper wall segments and closed-door area.

FIG. 15*a* shows a perspective view of a further example of a passenger compartment 310 arranged along the outer wall with partially open upper wall segments 312 and an open lower door area 314 and an open upper door area 318. Below the upper wall segments 312, lower wall segments 316 are formed as shell-like wall areas. Upper and lower wall segments can be formed identically or differently on both sides of the door area. FIG. 15*b* shows the passenger compartment 310 of FIG. 15*a* with closed upper wall segments 312 and closed upper door area 318 and closed lower door area 314.

Figure 16:
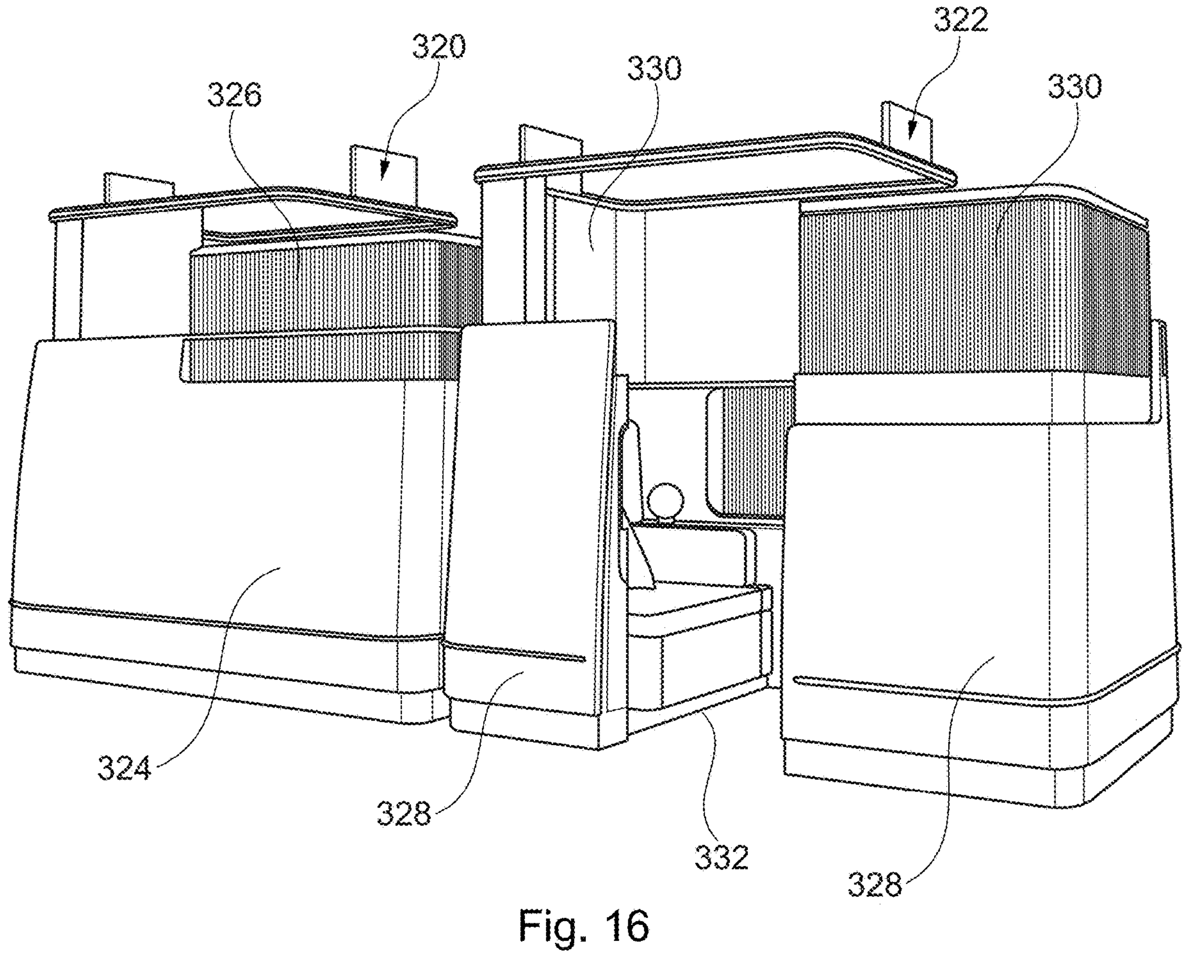
FIG. 16 shows a perspective view of two passenger compartments arranged side by side, which can be arranged in the central area of the cabin.

FIG. 16 shows a perspective view of two passenger compartments 320, 322 arranged side by side, which can be arranged in the central area of the cabin.

The left passenger compartment 320 is shown from a rear side, so to speak, and has a fixed lower wall section 324 and an open upper wall section 326.

The right-hand passenger compartment 322 is shown from a front side and has a fixed lower wall section 328 and an open upper wall section 330. A door opening 332, which is shown open, is provided between two (here differently formed) wall sections.

The embodiments described above can be combined in different ways. In particular, aspects of the devices can also be used for the embodiments of the method and vice versa.

In addition, it should be noted that "comprising" does not exclude other elements or steps and "one" or "a" does not exclude a plurality. Furthermore, it should be noted that features or steps described with reference to one of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger compartment for an aircraft cabin, the passenger compartment comprising:

an enclosing wall;

a compartment space formed by the enclosing wall, wherein at least one passenger seating device is arranged within the compartment space; and a door area in the enclosing wall, wherein an access opening to the compartment space is formed in the door area and the access opening is configured to close with a movable door device, wherein the enclosing wall has wall sections which extend from a floor at least up to a head height of a standing passenger, wherein at least one portion of the wall sections are designed as hybrid walls, each having a lower wall segment and an upper wall segment, wherein the lower wall segment is formed fixed and the upper wall segment is formed variable so that a permeability in the upper wall segment is configured to be modified, wherein the door area is located between vertically inclined lower wall segments inclined in a vertical extension from the floor towards the compartment space.

2. The passenger compartment according to claim 1, wherein the enclosing wall surrounds the compartment space circumferentially.

3. The passenger compartment according to claim 1, wherein the permeability is for air and light.

4. The passenger compartment according to claim 1, wherein in the at one portion of the wall sections designed as hybrid walls, the upper wall segment has a movable closure device with which an opening of the enclosing wall is configured to be blocked.

5. The passenger compartment of claim 4, wherein the movable closure device is movable between a closure position and an opening position; and i) wherein the opening is closed nontransparent by the closure device in the closure position and is at least partly transparent in the opening position; or ii) wherein the opening is acoustically attenuatingly closed by the closure device in the closure position compared to the opening position; or iii) wherein an air exchange between the compartment space and an adjacent surrounding of the aircraft cabin via the opening is reduced by the closure device in the closure position compared to the opening position; or iv) any combination thereof.

6. The passenger compartment according to claim 1, wherein the enclosing wall comprises at least two adjacent upper wall segments, the at least two adjacent upper wall segments being of two sides of the compartment space which are adjacent to each other in a horizontal direction, and the at least two adjacent upper wall segments configured to be opened in such a way that an opening is formed which extends at least partially over the two sides of the compartment space.

7. The passenger compartment according to claim 1, wherein the lower wall segment extends from the floor at least to above a head height of a seated person, or wherein the upper wall sections extend up to a cabin ceiling or up to fixtures in a ceiling area, or both.

8. The passenger compartment according to claim 1, wherein the lower wall segment comprises a fixed wall shell, or wherein the upper wall segment has an area and is resilient over at least half of the area when an opening in the enclosing wall is closed.

9. The passenger compartment according to claim 1, wherein the upper wall segment comprises a horizontally slidable curtain.

10. The passenger compartment according to claim 9, wherein the horizontally slidable curtain is held movably at the top on a rail and is guided in the lower region in a receptacle on the lower fixed wall shell, or wherein the horizontally slidable curtain has vertically extending reinforcement areas, or both.

11. The passenger compartment according to claim 1, wherein the upper wall segment comprises at least one element selected from a group consisting of:

a horizontally slidable closure element;

a foldable closure element having a plurality of vertically running folding axes;

vertical slats configured to rotate about a vertical axis and optionally also horizontally displaceable;

a roller blind configured to wind in a horizontal direction on a vertical axis; and a roller blind configured to wind in a vertical direction on a horizontal axis.

12. The passenger compartment according to claim 1, wherein the movable door device comprises a lower door segment and an upper door segment which are configured to move independently from each other.

13. An aircraft comprising:

a fuselage; and an aircraft cabin formed in the fuselage, wherein at least one passenger compartment according to claim 1 is provided in the aircraft cabin.

14. A method for adapting an aircraft cabin compartment, the method comprising the following steps:

a) providing the passenger compartment according to claim 1; and b) varying the permeability of the upper wall segment.

* * * * *